United States Patent Office 2,805,264
Patented Sept. 3, 1957

2,805,264

PRODUCTION OF TETRACHLOROBENZENE

Lehr F. Kissling, Wadsworth, Ohio, assignor to Columbia-Southern Chemical Corporation, Allegheny County, Pa., a corporation of Delaware No Drawing. Application February 12, 1954, Serial No. 410,040

7 Claims. (Cl. 260—650)

This invention is directed to a novel method of preparing 1,2,4,5-tetrachlorobenzene and more particularly 1,2,4,5-tetrachlorobenzene of high purity.

It has been recognized that polychlorobenzenes including tetrachlorobenzenes may be prepared by chlorinating benzene or lower chlorinated benzenes in the presence of a suitable substitution chlorination catalyst such as ferric chloride or the like. Generally, such processes have the disadvantage of producing a mixture of polychlorinated benzenes including a mixture of two or more tetrachlorobenzene isomers. Separation of the latter isomers is not easily achieved thus making it difficult to obtain high purity 1,2,4,5-tetrachlorobenzene. Preparation of high purity 1,2,4,5-tetrachlorobenzene has heretofore been achieved by complicated and often inefficient processes.

According to this invention, a simple and efficient process is provided whereby high purity 1,2,4,5-tetrachlorobenzene is obtained. It has been unexpectedly discovered that high quality 1,2,4,5-tetrachlorobenzene may be separated from a liquid mixture of polychlorobenzenes including at least one other tetrachlorobenzene, usually 1,2,3,4-tetrachlorobenzene, by crystallizing 1,2,4,5-tetrachlorobenzene therefrom in the presence of a substitution catalyst such as ferric chloride when the mixture is acidic, e. g. when the mixture has a pH below 7.

Depending to some extent on the manner in which the tetrachlorobenzene is provided, as will hereinafter be more fully elucidated, the exact composition of the liquid mixture from which the 1,2,4,5-tetrachlorobenzene is crystallized may vary widely. Mostly, the components include both lower and higher chlorinated benzenes, such as trichlorobenzenes and pentachlorobenzenes. If, benzene, monochlorobenzene or dichlorobenzene is used as a starting material in the chlorination to provide a mixture of the character herein contemplated, small quantities thereof may be present. When trichlorobenzene, such as 1,2,4-trichlorobenzene is chlorinated to the tetrachloro stage, lower chlorinated products other than trichlorobenzene are not normally encountered.

In one contemplated procedure, benzene or lower chlorinated benzenes such as mono-, di- and/or trichlorobenzenes are chlorinated to tetrachlorobenzene with elemental chlorine in the presence of a suitable catalyst such as ferric chloride or aluminum chloride, whereafter the 1,2,4,5-tetrachlorobenzene is separated by crystallization under acidic conditions such as are provided by the presence of hydrogen chloride. Usually, crystallization is effected by cooling the chlorinated reaction mixture. Such chlorinations are conducted at temperatures on the order of 20° C. to 140° C. and preferably above 40° C., such as 50° C. to 120° C. in order to take advantage of the higher chlorination rates and chlorine efficiency resulting at these higher temperatures as well as to avoid formation of any consequential quantity of solid polychlorobenzenes, especially tetrachlorobenzenes. In the case where solid formation occurs to any sizeable extent, such as when chlorination temperatures below 40° C. are used it may be necessary to dissolve this solid, such as by elevating the mixture temperature, prior to crystallizing.

After the chlorination is concluded, 1,2,4,5-tetra-chlorobenzene is recovered from the liquid phase of the resulting materials or any portion thereof which contains the desired isomer, at least one other tetrachlorobenzene and normally one or more lower chlorinated benzenes by selectively crystallizing 1,2,4,5-tetrachlorobenzene therefrom. This crystallization is promoted by reducing the temperature of the composition so that at least 50 percent, more usually a minimum of 60 percent, and preferably over 80 percent of the 1,2,4,5-tetrachlorobenzene precipitates as a solid. The exact degree of cooling, it will be appreciated, is interrelated to the degree of conversion to tetrachlorobenzene, the chlorination temperature and also the exact composition of the medium. Lowering the temperature generally at least 10 or 15° C. below the chlorination temperature, and notably to a temperature of from 0° C. to 30° C. effects the desired results.

Formation of the solid 1,2,4,5-tetrachlorobenzene must occur in an acidic, liquid medium containing a substitution chlorination catalyst in order to practice this invention and thereby obtain a high grade product. Typical chlorination substitution catalysts of this character are well known and include ferric chloride, aluminum chloride and other metal containing Friedel-Crafts compounds, for example, stannic chloride, titanium tetrachloride, zinc chloride, bismuth tetrachloride, antimony pentachloride, etc. They should be present in limited quantities for optimum operation, normally in concentrations of 0.01 to 5 percent by weight of the medium. The acidic nature of the medium during solid formation exerts a desirable influence on the quality of the solid phase (1,2,4,5-tetrachlorobenzene) formed. When the medium is at a pH of below 7, such as provided by the presence of inorganic acids among which are hydrogen chloride, phosphoric acid, etc., this phenomenon is observed. In the case of hydrogen chloride at least about 0.2 mole thereof per mole of tetrachlorobenzene provides the desired acidity.

If care is taken to retain a substantial portion of hydrogen chloride in the reaction mixture containing 1,2,4,5-tetrachlorobenzene such as is provided by substitution chlorination of benzene or chlorinated benzenes, a satisfactory acidity is imparted to the medium from which 1,2,4,5-tetrachlorobenzene may be precipitated. Thus, in one preferred embodiment of the invention, the by-product hydrogen chloride present by virtue of the chlorination of benzenes, if maintained in the medium while cooling, exerts the desired influence on the product's quality. It is essential, however, to avoid steps which result in removing any consequential amount of hydrogen chloride in conjunction with this embodiment; thus blowing any non-acidic or non-acidifying gaseous material through the medium after the chlorination step, whereby removal of the residual hydrogen chloride results such as passing air therethrough, should be omitted. Of course, if the residual hydrogen chloride escapes from the medium, it, or other acidifying agents including chlorine and inorganic acids, may be added to impart suitable acidity to the medium prior to crystallization.

Once the 1,2,4,5-tetrachlorobenzene has been precipitated, as by cooling, the resulting solid phase is separated from the remaining liquid medium by recognized expedients including filtration, centrifugation, decantation and the like. Further treatment of each of the two separated components comprises additional embodiments of the invention. The liquid phase or mother liquor, after removal of the solid 1,2,4,5-tetrachlorobenzene, still may contain up to 50 percent of the total 1,2,4,5-tetrachlorobenzene originally present, but under optimum conditions contains about 5 to 20 percent of all the 1,2,4,5-tetrachlorobenzene initially present. By further depressing the temperature of this mother liquor another crystal crop may be provided which also may contain high grade 1,2,4,5-tetrachlorobenzene. Recovery of the second crop may be effected in the same manner as the first crop.

Alternatively or in conjunction with the second cooling and recovery step, the remaining mother liquor, usually comprising mainly underchlorinated benzenes, may be recycled for further chlorination in a continuous or batch operation. Prior thereto, it may be desirable to separate in varying degrees the components by fractional distillation or other expedient and make use of individual cuts taken from the distillation. One of the additional advantages provided by practice of this invention is that the mother liquor or portions thereof can be recycled and combined when so desired, with fresh chlorinatable benzenes and chlorobenzenes for chlorination without addition of substitution chlorination catalyst, or at least with a sizeable reduction in the catalyst requirements under less favorable circumstances.

The initial solid phase, or in some cases both solid crops, may be further treated, particularly to remove any entrapped mother liquor by washing, usually with any of a wide number of solvents including ketones such as acetone, alcohols such as methanol or ethanol as well as liquid polychlorobenzenes including monochlorobenzene, orthodichlorobenzenes and trichlorobenzenes especially 1,2,4-trichlorobenzene. Gentle heating, topping, or more suitably air drying of the washed crystals may also be included. If the wash comprises a polychlorobenzene, it may in turn be recovered and treated the same as or combined with the mother liquor.

A typical combination of both benzene chlorination and separation of the 1,2,4,5-tetrachlorobenzene contemplated herein, for example, involves chlorination at 60 to 120° C. of 1,2,4-trichlorobenzene with elemental chlorine, gaseous or liquid, to the tetrachlorobenzene stage by use of appropriate quantities of reactants based on stoichiometric calculation, but generally providing for excess trichlorobenzene whereby a liquid medium is provided even preferably to the extent that a solution results. Ferric chloride, or equivalent chlorination catalyst in catalytic amounts, typically between 0.01 and 3.0 percent or more by weight of the trichlorobenzene is employed. After conducting the reaction and without permitting all the hydrogen chloride to leave the liquid medium, the resulting mixture is cooled to about 20 to 30° C. and the solid phase recovered by filtration. This solid phase contains only one tetrachlorobenzene, 1,2,4,5-tetrachlorobenzene, in substantial quantities on the order of about 88 to 95 percent of all such isomer in the mixture. Except for small quantities of 1,2,4-trichlorobenzene which are easily removed by washing or topping, the product is substantially pure 1,2,4,5-tetrachlorobenzene. Remaining in the liquid phase is essentially all of the 1,2,3,4-tetrachlorobenzene produced by chlorination.

The following examples illustrate the manner in which the invention may be practiced.

*Example 1*

Into a three-necked flask, 550 grams of 1,2,4-trichlorobenzene was charged along with 10 grams of ferric chloride. Then over a period of 2.5 hours, gaseous chlorine was introduced with the maximum temperature being 110° C. At the conclusion of the chlorine addition the resulting liquid medium containing residual hydrogen chloride was cooled to room temperature, 25° C.

The solid phase formed as a result of the cooling then was separated by filtration. These separated crystals, after washing with acetone were dried at 90° C. and analyzed by infrared spectroanylitic procedures. Also, the composition of the liquid medium remaining after the separation was determined.

|  | Infrared Analysis—Chlorobenzenes, Percent by Weight | | |
|---|---|---|---|
|  | 1,2,4,5- | 1,2,3,4- | 1,2,4- |
| Washed crystals | 98.0 | None | 2.0 |
| Liquid phase | 7.6 | 35.8 | 48.5 |

As can be readily seen, the 1,2,4,5-tetrachlorobenzene in the crystal product is not admixed with 1,2,3,4-tetrachlorobenzene. The small quantity of 1,2,4-trichlorobenzene may be readily removed by fractional distillation.

*Example II*

1,167 grams of a reaction mixture of 1,2,4-trichlorobenzene which had been partially chlorinated in the absence of detectable water to the tetrachlorobenzene stage in the presence of a catalytic quantity of ferric chloride and which contained the by-product hydrogen chloride was filtered through #50 filter paper at about 20° C. These filtered crystals were washed with acetone containing a few drops of 30° percent hydrochloric acid and then dried.

The filtrate, after removing a portion thereof for sampling, was thereafter cooled to 4–5° C. and filtered to obtain a second crop of crystals, which was washed with a small amount of acetone. Both acetone washings were combined and cooled to 4° C. to recover any dissolved product.

Individual weights and analyses of the respective products during processing were determined and are as follows:

| Material | Weight (Grams) | Infrared Analysis—Chlorobenzenes, Percent by Weight | | |
|---|---|---|---|---|
|  |  | 1,2,4,5- | 1,2,3,4- | 1,2,4- |
| Starting | 1,167 | 44.1 | 23.1 | 32.8 |
| First crystal crop after washing | 420 | 93.6 | None | 6.4 |
| First filtrate | 476 | 7.1 | 40.1 | 53.4 |
| Second crystal crop after washing | 26 | 79.2 | 1.6 | 16.8 |
| Second filtrate | 310 | 4.3 | 41.5 | 53.9 |
| Crystals from acetone washings | 24 | 90.6 | None | 6.0 |

Again, the above experiment demonstrates the efficient manner in which 1,2,4,5-tetrachlorobenzene of high purity may be obtained by practice of this invention.

*Example III*

Some 1,012 grams of a liquid reaction medium from chlorinated 1,2,4-trichlorobenzene which had been in part chlorinated to the tetrachlorobenzene stage and still contained the ferric chloride catalyst and by-product hydrogen chloride was placed in a flask. This liquid contained 41.1 percent 1,2,4,5-tetrachlorobenzene, 23.1 percent 1,2,3,4-tetrachlorobenzene and 32.8 percent 1,2,4-trichlorobenzene, all by weight. Chlorine gas then was bubbled through the liquid for 3 minutes whereafter it was cooled to 22° C.

The resulting medium was filtered with suction on a buchner funnel; these separated solids then were slurried in acetone, filtered and washed with acetone. Some 402 grams of crystal containing no 1,2,3,4-tetrachlorobenzene, only 3.4 percent by weight 1,2,4-trichlorobenzene and 96.6 percent by weight 1,2,4,5-tetrachlorobenzene were obtained.

Filtrate from the initial filtration weighed 382 grams and contained by weight but 7.2 percent 1,2,4,5-tetrachlorobenzene, 40.3 percent 1,2,3,4-tetrachlorobenzene and 50.1 percent 1,2,4-trichlorobenzene by infrared spectroanalysis.

Example IV

One gallon of chlorinated 1,2,4-trichlorobenzene still containing the ferric chloride catalyst and by-product hydrogen chloride was heated until a liquid medium was obtained whereafter it was cooled to 26° C. and filtered with suction. The thusly obtained crystals, less a 25 gram sample, were washed with 267 grams of acetone and then dried at 90° C. Solute in the acetone was recovered by evaporating the acetone at 90° C.

The following represents the observed data.

| Material | Weight (Grams) | Infrared Analysis—Chlorobenzenes, Percent by Weight | | |
|---|---|---|---|---|
| | | 1,2,4,5- | 1,2,3,4- | 1,2,4- |
| Starting material | 633 | 39.7 | 20.3 | 37.8 |
| Washed crystals | 186 | 93.8 | None | 5.0 |
| Filtrate | 258 | 6.0 | 34.7 | 51.7 |
| Washing less acetone | 137 | 11.2 | 34.1 | 49.2 |

Example V

A sample of chlorinated 1,2,4-trichlorobenzene still containing by-product hydrogen chloride and the ferric chloride catalyst was cooled to room temperature, 25° C., and filtered on a suction filter. The filtered solid phase was then washed with 1,2,4-trichlorobenzene at 20° C. Also a small sample was washed with ethanol. The following table presents observed data:

| Material | Weight (Grams) | Infrared Analysis—Chlorobenzenes, Percent by Weight | | |
|---|---|---|---|---|
| | | 1,2,4,5- | 1,2,3,4- | 1,2,4- |
| Starting | 587 | 39.7 | 20.4 | 37.8 |
| Trichlorobenzene washed crystals | 310 | 71.6 | 0.4 | 28.0 |
| Mother Liquor left after crystallization | 230 | 6.2 | 34.5 | 51.7 |
| Trichlorobenzene Washings | 238 | 6.6 | 18.7 | 70.2 |
| Ethanol Washed crystals | | 93.8 | 0.4 | 5.2 |

Although this invention has been described with reference to particular details of special embodiments thereof, it is not intended to limit the invention thereto except insofar as they are included in the appended claims.

I claim:

1. A method of recovering 1,2,4,5 - tetrachlorobenzene of high purity from a mixture thereof and at least one other tetrachlorobenzene isomer which comprises establishing an acidic, liquid medium containing 1,2,4,5-tetrachlorobenzene and at least one other tetrachlorobenzene isomer, an inorganic acid, and from 0.1 to 5.0 percent by weight of the medium of a metal containing Friedel-Crafts substitution chlorination catalyst, said inorganic acid being employed in an amount sufficient to maintain a degree of acidity in said medium equivalent to that produced therein by said catalyst and at least about 0.2 moles of hydrogen chloride per mole of tetrachlorobenzene, and crystallizing high purity 1,2,4,5-tetrachlorobenzene therefrom.

2. A method of producing 1,2,4,5-tetrachlorobenzene which comprises cooling a liquid medium containing a metal containing Friedel-Crafts substitution chlorination catalyst, 1,2,4,5 - tetrachlorobenzene, at least one other tetrachlorobenzene and at least 0.2 moles of hydrogen chloride per mole of tetrachlorobenzene whereby to crystallize 1,2,4,5 - tetrachlorobenzene and recovering the crystallized 1,2,4,5 - tetrachlorobenzene.

3. A method of producing 1,2,4,5-tetrachlorobenzene which comprises catalytically chlorinating 1,2,4 - trichlorobenzene with elemental chlorine whereby a liquid medium containing a metal containing Friedel-Crafts catalyst, 1,2,4 - trichlorobenzene, 1,2,4,5 - tetrachlorobenzene, 1,2,3,4 - tetrachlorobenzene and hydrogen chloride is established, crystallizing 1,2,4,5 - tetrachlorobenzene from said medium while it still contains at least 0.2 mole of the chlorination by-product hydrogen chloride per mole of tetrachloride and recovering the crystallate.

4. A method of producing 1,2,4,5 - tetrachlorobenzene which comprises chlorinating a material selected from the group consisting of benzene and chlorobenzenes having a maximum of 3 chlorine atoms per molecule in the presence of a metal containing Friedel-Crafts substitution chlorination catalyst whereby a liquid medium containing at least two tetrachlorobenzene isomers is provided, one isomer of which is 1,2,4,5 - tetrachlorobenzene, cooling said liquid medium which contains at least about 0.2 moles of chlorination by-product hydrogen chloride per mole of tetrachlorobenzene to crystallize 1,2,4,5 - tetrachlorobenzene and recovering the crystallate.

5. A method of producing 1,2,4,5 - tetrachlorobenzene which comprises crystallizing 1,2,4,5 - tetrachlorobenzene from an acidic medium containing 1,2,4,5 - tetrachlorobenzene, a metal containing Friedel-Crafts substitution chlorination catalysts and at least one other tetrachlorobenzene isomer, said medium containing at least about 0.2 mole of hydrogen chloride per mole of tetrachlorobenzene receiving the crystallate and washing said crystallate with acetone.

6. A cyclic process for producing 1,2,4,5 - tetrachlorobenzene which comprises catalytically chlorinating in the presence of a metal containing Friedel-Crafts catalyst a material selected from the group consisting of benzene and chlorobenzenes containing up to 3 chlorine atoms per molecule whereby to provide a liquid, acidic medium containing 1,2,4,5 - tetrachlorobenzene and at least one other isomer of tetrachlorobenzene, retaining in the medium at least about 0.2 mole of the by-product hydrogen chloride of the catalytic chlorination per mole of tetrachlorobenzene cooling the medium to crystallize 1,2,4,5 - tetrachlorobenzene, separating the crystallate and recycling mother liquor from said separation for chlorination.

7. The method of claim 6 wherein the medium is cooled to at least between about 10° C. to 15° C. below the temperature of chlorination.

References Cited in the file of this patent
UNITED STATES PATENTS 1,934,675    Mills    Nov. 7, 1933